United States Patent
Tamura

(10) Patent No.: US 6,786,524 B2
(45) Date of Patent: Sep. 7, 2004

(54) GLOVE BOX FOR VEHICLE

(75) Inventor: Takashi Tamura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/336,427

(22) Filed: Jan. 6, 2003

(65) Prior Publication Data

US 2003/0129418 A1 Jul. 10, 2003

(30) Foreign Application Priority Data

Jan. 8, 2002 (JP) .................................. 2002-001407

(51) Int. Cl.$^7$ .......................... B60N 3/12; B60R 21/045
(52) U.S. Cl. ....................... 296/37.12; 296/70; 280/752
(58) Field of Search ............................. 296/37.12, 37.8, 296/70, 37.16, 74; 180/90; 280/752; 224/483

(56) References Cited

U.S. PATENT DOCUMENTS

| | | | |
|---|---|---|---|
| 5,071,162 A | | 12/1991 | Takagawa |
| 5,413,379 A | | 5/1995 | Koma |
| 5,431,442 A | * | 7/1995 | Tomita et al. ........... 296/37.12 |
| 5,921,029 A | * | 7/1999 | Stukerjurgen ........... 296/37.12 |
| 5,925,435 A | * | 7/1999 | Togawa et al. ............. 280/752 |
| 6,076,878 A | * | 6/2000 | Isano ...................... 296/37.12 |
| 6,106,043 A | * | 8/2000 | Izumo ..................... 296/37.12 |
| 6,152,512 A | * | 11/2000 | Brown et al. ............ 296/37.12 |
| 6,213,504 B1 | * | 4/2001 | Isano et al. .................. 296/70 |
| 6,315,350 B1 | * | 11/2001 | Nakane et al. ............. 296/39.1 |
| 6,478,255 B1 | * | 11/2002 | Brooker et al. ............. 280/752 |

FOREIGN PATENT DOCUMENTS

| | | | | |
|---|---|---|---|---|
| JP | 40687383 A | * | 3/1994 | .............. 296/37.12 |
| JP | 406156149 A | * | 6/1994 | .............. 296/37.12 |
| JP | 8-192465 | | 7/1996 | |

* cited by examiner

Primary Examiner—D. Glenn Dayoan
Assistant Examiner—Greg Blankenship
(74) Attorney, Agent, or Firm—McGinn & Gibb PLLC

(57) ABSTRACT

In a vehicle glove box including a main body provided movably to an instrument panel, a lid portion provided to the main body on the interior side and forming a closed section with a surface of the main body on the interior side, and a reinforcing member of a substantially plate-like shape extending across the closed section in the width direction of the main body, a plurality of support portions provided to the main body on the interior side in the form of protrusions which extend toward the interior. These support portions support a peripheral surface of the reinforcing member, so that the reinforcing member can be thus provided to the main body to form an integral structure. In this way, it is possible to provide the glove box which can be assembled through a simple and easy assembling process and thereby reduce the burden to an operator.

23 Claims, 6 Drawing Sheets

GLOVE BOX FOR VEHICLE

BACKGROUND OF THE INVENTION

The present invention relates to a glove box which is for use in a vehicle and is provided at an opening portion of an instrument panel facing a passenger compartment within the vehicle.

The present application claims priority from Japanese Application No. 2002-001407, the disclosure of which is incorporated herein by reference.

Conventionally, there has been known a glove box of a type which includes a main body made of resin and provided pivotally to the instrument panel facing the passenger compartment, and a lid portion made of resin and provided to the main body on the interior side thereof, forming a closed section with the interior face of the main body.

The glove box of this type is provided with a metal reinforcing member in a space between the main body and the lid portion. The reinforcing member is fastened to the main body with fastening means, such as screws. In this way, the reinforcing member enables the glove box to have a desired rigidity and a desired strength.

The glove box of this type, however, has a problem that fastening the reinforcing member to the main body with screws or the like complicates a process of assembling the glove box and hence imposes a heavy burden on an operator (worker) in charge of assembling operations.

SUMMARY OF THE INVENTION

The present invention is devised in order to solve above-mentioned problems, and therefore, has an object to provide a glove box which can be assembled through a simple and easy assembling operation and thereby reduce a burden on an operator (worker) in charge of assembling operations.

In order to achieve above and other objects, a first aspect of the present invention provides the glove box for use in a vehicle and adapted to be able to open and close at an opening portion of an instrument panel facing a passenger compartment within the vehicle, comprising: a main body movably provided to the instrument panel; a lid portion provided to the main body on an interior side and forming a closed section with an interior side of the main body; and a reinforcing member extending in a width direction of the main body. Specifically, a plurality of supporting portions are provided to the main body on the interior side thereof, thereby forming protrusions extending toward the interior side for supporting a peripheral face of the reinforcing member.

According to the first aspect of the invention, the operator (worker) can assemble the glove box in a simple and easy manner by fitting the lid portion to the main body after having the respective supporting portions support the reinforcing member.

Also, since a peripheral surface of the reinforcing member is supported by the respective support portions at several positions, the reinforcing member can be provided to the main body to form an integral structure.

Hence, the burden to the operator for assembling the glove box can be reduced. In other words, for example, it goes without saying that the present invention makes it possible to omit complicated operations, such as fastening many screws during the assembling, which are otherwise essential in the aforementioned prior art where the reinforcing member is fastened to the main body with the screws.

Moreover, a total number of components can be reduced by omitting components used for fastening the screws.

Also, since the reinforcing member is provided to the main body to form an integral structure, it is possible to largely improve the rigidity and the strength of the glove box. In other words, there would not be a problem that the reinforcing member fits to the main body only in the vicinity of the portions fastened with the screws, resulting in a reinforcing member failing to have an enough rigidity (where the problem will occur as the reinforcing member is fastened to the main body with screws).

A second aspect of the present invention provides a glove box, in which each support portion of the main body is given with a tilt in a direction to be spaced apart from the reinforcing member toward the interior; and in which the peripheral surface of the reinforcing member is given with the same tilt as that of the support portions, the tilt being toward the interior in correspondence with the tilt given to each support portion.

According to the second aspect of the invention, in addition to advantages of the first aspect, since the tilt is given to both the peripheral surface of the reinforcing member and the respective support portions of the main body, the operator can fit therein forcing member to the main body from the interior side in a simple and easy manner when the glove box is assembled. Also, once being fit together, the peripheral surface of the reinforcing member and the respective support portions of the main body are in close contact with each other, thus exactly fastening the reinforcing member to the main body.

Therefore, it is possible to further reduce the burden to the operator when the glove box is assembled. Also, since the reinforcing member is in close contact with the main body, the reinforcing member and the main body deform simultaneously as one unit. Hence, when a load is applied to the glove box, the reinforcing member and the main body can together resist the load effectively. In other words, as compared with the type that the reinforcing member and the main body are not in close contact with each other, the rigidity and the strength of the glove box of the present invention can be improved remarkably.

A third aspect of the invention provides the glove box, in which the main body, the reinforcing member, and the lid portion are all made of a resin material and assembled integrally by welding to one another.

According to the third aspect of the invention, in addition to the advantages of the first or second aspect, the operator can at first fit the reinforcing member to the main body, then fit the lid portion to the main body, followed by welding together these components so as to form an integral structure, by such a method as a heat treatment.

In this way, the glove box may be molded integrally, which makes it possible to largely improve the rigidity and the strength of the glove box.

A fourth aspect of the invention provides the glove box in which the reinforcing member is formed into a grid-like structure having pores extending in the thickness direction thereof.

According to the fourth aspect of the invention, in addition to the advantages of any one of the first through third aspects, by forming therein forcing member into the grid-like structure having pores in the thickness direction, the reinforcing member can be reduced in weight without lowering the strength of the reinforcing member with respect to a compression force to the thickness direction.

Accordingly, even when the load is applied from the passenger to the reinforcing member substantially in the compressing direction when the passenger body hits the glove box at a time of a vehicle collision, the glove box can support the passenger in a suitable manner, and there is no trouble in the safety in the event of a vehicle crash. Also, a reduction in weight of therein forcing member can reduce not only the burden to the operator when the glove box is assembled, but also the weight of the glove box, and hence, the weight of the vehicle can also be effectively reduced.

A fifth aspect of the invention provides a glove box in which the reinforcing member is provided with bonding portions to be connected with the lid portion, the bonding portions being formed on one side of the reinforcing member and facing the lid portion.

According to the fifth aspect of the invention, in addition to the advantages of the fourth aspect, by connecting the bonding portions of the reinforcing member with the lid portion, the reinforcing member can be fastened to the lid portion.

Provided that the reinforcing member used includes bonding portions of the same shape, even when a reinforcing member has a grid structure of a different shape and a different grid interval, the magnitude of the reaction force or the like acting on the lid portion will be substantially the same everywhere because of the connection with the reinforcing member (by virtue of the bonding portions), and the deformation of the lid portion will also be the same everywhere when the glove box is assembled. In short, even when a different reinforcing member is used, it is possible to manufacture the glove box having substantially the same outward appearance.

Therefore, by connecting the bonding portions of the reinforcing member with the lid portion, fastening the grid-like reinforcing member to the lid portion can be made exactly, thus making it possible to further improve the rigidity and the strength of the glove box.

Also, since the reinforcing member can be changed depending on the strength required by the glove box, the invention is quite advantageous for a practical use. Further, when a different strength is required for the glove box depending on the type of vehicle or a place of destination, a necessary operation is only to change the reinforcing member alone, while all the other components (except for the reinforcing member) can remain the same, thereby making it possible to largely reduce the manufacturing cost.

A sixth aspect of the invention provides a glove box in which the reinforcing member is provided on an upper side of the lid portion.

According to the sixth aspect of the invention, in addition to the advantages of any one of the first through fifth aspects, the reinforcing member can be reduced both in size and weight because the reinforcing member is provided to correspond not to the entire lid portion but only to the upper portion thereof.

Therefore, when a passenger is forced to move forward during a vehicle collision or the like, the knees of the passenger will hit the upper side of the lid portion, so that a load from the passenger will act on the glove box from the upper side of the lid portion. In other words, the load applied from the passenger acts on the glove box directly at the portion where the reinforcing member is provided.

Thus, when the operator assembles the glove box, he or she only has to fit a light and compact reinforcing member into the main body, so that the burden to the operator can be reduced further. Also, a reduction of the reinforcing member in the size and weight can reduce the manufacturing cost and the weight of the vehicle.

In addition, the glove box can efficiently receive a load from the passenger during the vehicle collision, thereby rendering the invention quite advantageous in terms of the safety performance.

A seventh aspect of the invention provides a glove box in which the reinforcing member is formed in such a manner that the size in the thickness direction is lessened in a downward direction.

According to the seventh aspect of the invention, in addition to the advantages of any one of the first through sixth aspects, the reinforcing member can be reduced in weight because the dimension in the thickness direction of the reinforcing member is smaller at the lower side.

Accordingly, when the passenger is forced to move forward during a vehicle collision or the like, the knees of the passenger hit the upper side of the lid portion, and the load from the passenger acts on the glove box from the upper side of the lid portion. In other words, the load applied from the passenger acts on the glove box directly at the portion where the reinforcing member has a larger size in the thickness direction than others.

Besides, when the operator assembles the glove box, he or she only has to fit a light reinforcing member into the main body, so that the burden to the operator can be thus reduced. Also, the reduction of the reinforcing member in the weight can reduce the manufacturing cost and the weight of the vehicle.

In addition, the glove box can efficiently receive the load from the passenger at the vehicle collision or the like, thereby rendering the present invention quite advantageous in terms of safety in the event of a vehicle crash.

BRIEF DESCRIPTION OF THE DRAWINGS

These and other objects and advantages of the present invention will become clearly understood from the following description with reference to the accompanying drawings, wherein.

DETAILED DESCRIPTION OF THE PREFERRED EMBODIMENTS

Figure 1:
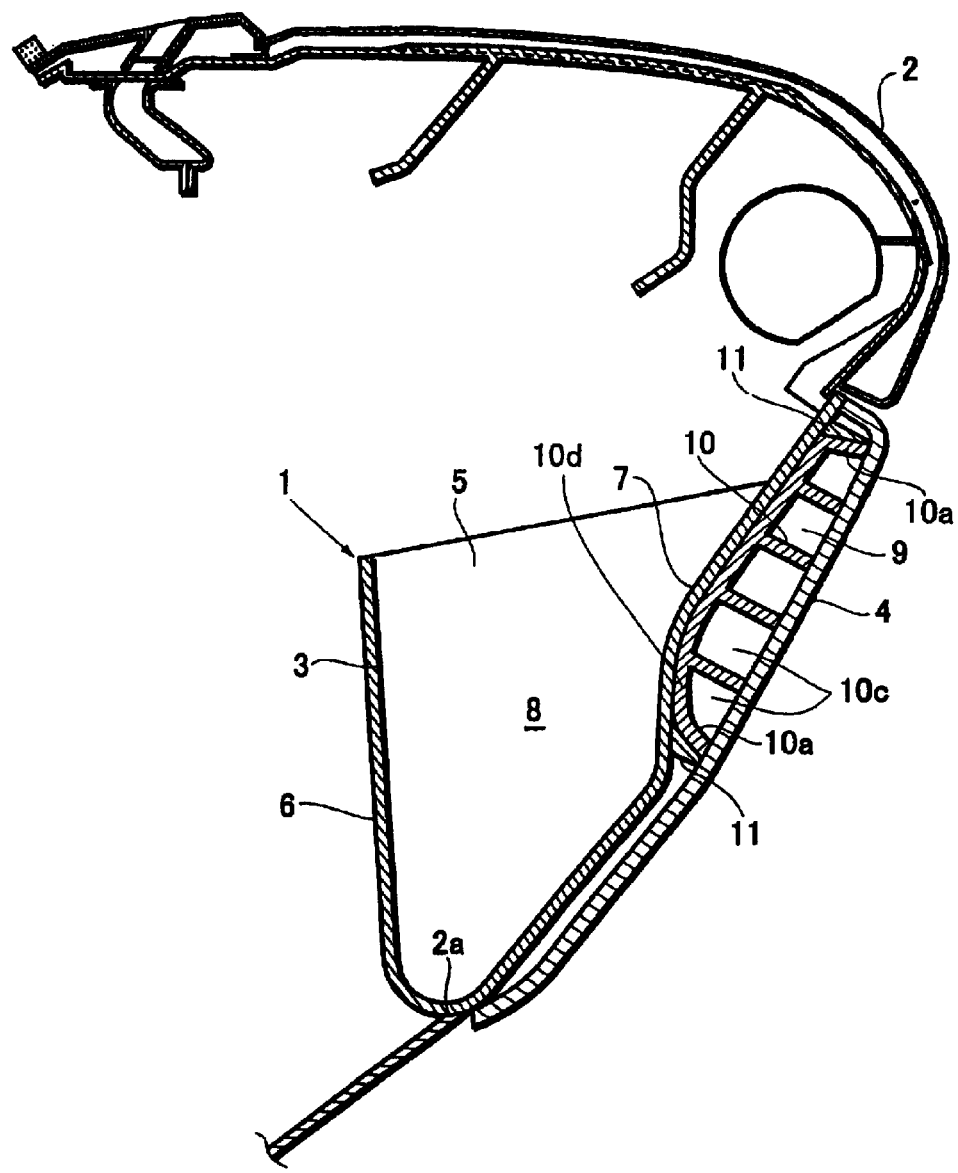
FIG. 1 is a schematic cross sectional view showing an instrument panel and a glove box formed according to one embodiment of the present invention.
Figure 2:
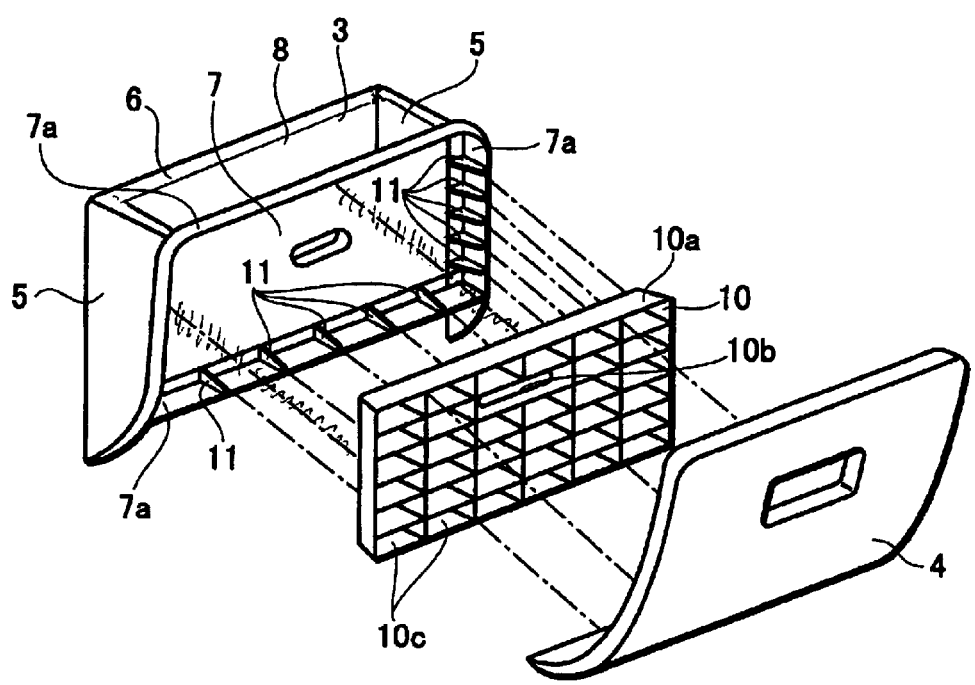
FIG. 2 is an exploded perspective view of the glove box.

FIGS. 1 through 4 show one embodiment of the present invention. FIG. 1 is a schematic cross section showing an instrument panel and a glove box. FIG. 2 is an exploded perspective view of the glove box.

As shown in FIG. 1, the glove box 1 for use in a vehicle can be opened and closed at an opening portion 2a of an instrument panel 2 which faces the passenger compartment on the front passenger side. In fact, the glove box 1 is supported to be pivotable about a shaft member which penetrates through a shaft hole (not shown) formed in the bottom end of the glove box 1 and another shaft hole formed in the instrument panel 2. To be more specific, when pivoting backward (toward the interior), the glove box 1 protrudes from the instrument panel 2 toward the interior, so that the glove box 1 becomes able to receive small articles and the like. When pivoting forward from this state, the glove box 1 fits into the instrument panel 2, so that the small articles may be received into an internal space on the back side the instrument panel 2.

As shown in FIG. 2, the glove box 1 includes a main body 3 movably provided to the instrument panel 2, and a lid portion 4 provided to the main body 3 on the interior side.

The main body 3 includes a pair of side faces 5 on the right and left, a front face 6, and a rear face 7, so that these four faces 5, 6, and 7 together define an internal receipt space 8 for receiving small articles and the like. The main body 3 is formed in such a manner that, while being fit into the instrument panel 2, the front face 6 extends almost vertically whereas the rear face 7 extends upward to the interior side with a tilt. In other words, in the present embodiment, the main body 3 is formed, as shown in FIG. 1, so as to be narrowed in the downward direction when viewed from one side.

As with the rear face 7 of the main body 3, the lid portion 4 is formed in such a manner so as to extend upward to the interior side with a tilt when the main body 3 is fit into the instrument panel 2. As shown in FIG. 1, the lid portion 4 forms a closed section with the rear face 7, which is the face of the main body 3 on the interior side. Herein, an extended portion 7a protruding toward the interior is provided along the edge area on the rear face 7 of the main body 3, so that the rear face 7, the extended portion 7a, and the lid portion 4 together define a closed space 9.

As shown in FIG. 2, a reinforcing member 10 to be fastened into the main body 3 and the lid portion 4 are provided within the closed space 9. In other words, as shown in FIG. 1, the reinforcing member 10 is provided within the aforementioned closed section. Specifically, the reinforcing member 10 is made into a plate-like configuration extending in the width direction (horizontal direction) of the main body 3.

Also, in the present embodiment, the closed space 9 is defined on the upper side of the glove box 1, and therefore, the reinforcing member 10 is provided on the upper side of the glove box 1. In addition, the reinforcing member 10 is formed in such a manner that the dimension in the thickness direction is lessened in the downward direction.

The extended portion 7a of the main body 3 is provided with a plurality of support portions 11 which protrude toward the inner area of the glove box 1 and thereby support a peripheral face 10a of the reinforcing member 10. Herein, the respective support portions 11 are provided to the extended portion 7a in the form of protrusions which extend toward the interior (backward) with the tilt in a direction to be spaced apart from the reinforcing member 10 toward the interior. In the present embodiment, the support portions 11 are provided on the top, the bottom, the right, and the left of the extended portion 7a, and the reinforcing member 10 is thus supported by the respective support portions 11 provided on the top, the bottom, the right, and the left sides of the main body 3.

Figure 3:
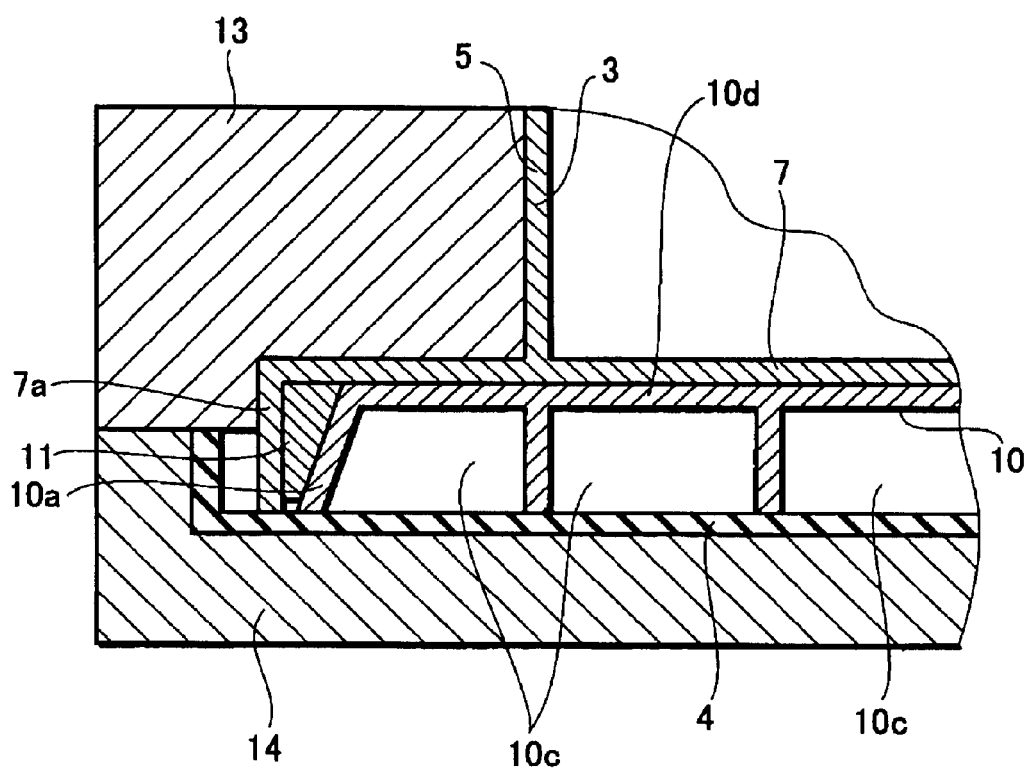
FIG. 3 is a partial plan cross sectional view of the glove box, illustrating the state when a main body, a lid portion, and a reinforcing member are fastened with jigs and welded to one another.
Figure 4:
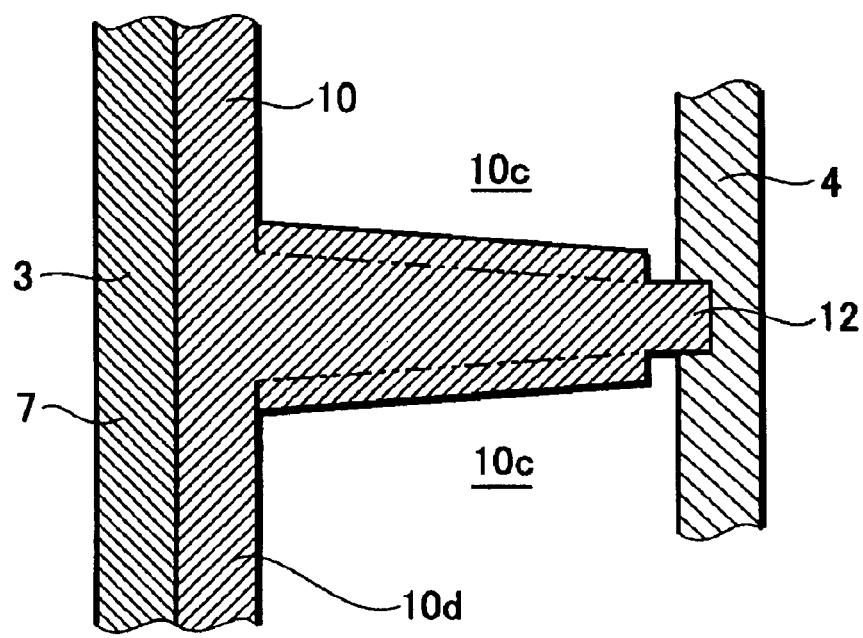
FIG. 4 is a partial cross section of the glove box, showing the state when the reinforcing member is connected to the lid portion.

As shown in FIG. 2, the reinforcing member 10 is formed into a grid-like structure having pores 10c in the thickness direction (front-to-rear direction). Herein, a closely contact face 10d which is brought into a close contact with the rear face 7 of the main body 3 is provided to the reinforcing member 10 on the main body 3 side, and the pores 10c are thereby blocked (or interfered) by the face 10d on the main body 3 side. Also, an opening portion 10b for attaching a lock (not shown) is formed through the reinforcing member 10 at the center in the thickness direction thereof. In addition, as shown in FIG. 4, bonding portions 12 serving as connecting means to be connected to the lid portion 4 are formed on one side the reinforcing member 10 and facing the lid portion 4 side. In other words, in the present embodiment, the reinforcing member 10 is connected to the lid portion 4 by bonding or adhering the bonding portions 12 to the lid portion 4. It should be noted that the detailed shape of each bonding portion 12 is omitted in FIGS. 1 through 3 for an easy explanation.

Also, the peripheral surface 10a of the reinforcing member 10 is given with the same tilt in a direction as that of the respective support portions 11 toward the interior in correspondence with the tilt given to the respective support portions 11. Further, the reinforcing member 10 is placed with the tilt so as to come down toward the lid portion 4. In the present embodiment, as shown in FIG. 1, various portions of the reinforcing member 10 are almost (or approximately) perpendicular to the lid portion 4 when viewed from one side (except for the peripheral face 10a given with the tilt), so that various portions of the reinforcing member 10 can be brought into the same as that of the respective support portions 11 of the main body 3. Incidentally, the angle of the tilt given to the reinforcing member 10 is set in such a manner that such an angle of the tilt is substantially coincident with a direction for a load to be applied from the passenger to the glove box 1 when the knees of the passenger hit the glove box 1 at the time of a vehicle collision. Also, in the present embodiment, as shown in FIG. 4, each grid portion of the reinforcing member 10 is tapered in a stepwise direction, and the step portion at the tip end is used as the bonding portion 12.

In addition, the main body 3, the lid portion 4, and the reinforcing member 10 forming the glove box 1 are all made of the resin and welded to one another to be assembled integrally. In other words, as shown in FIG. 3, after being fit together, the main body 3, the lid portion 4, and the reinforcing member 10 are subjected to the heat treatment while being pressed by jigs 13 and 14 to press against one another, and formed into one unit.

In regard to the glove box 1 arranged as described above, when an operator (worker) assembles the glove box 1, he or she has the respective support portions 11 of the main body 3 support the reinforcing member 10, and then fits the lid portion 4 onto the main body 3, thereby enabling the operator to assemble the glove box 1 in a simple and easy manner. Also, since the tilt is given to both the peripheral surface 10a of the reinforcing member 10 and the respective support portions 11 of the main body 3, the operator can fit the reinforcing member 10 into the main body 3 on the rear face 7 side in a simple and easy manner. Then, the reinforcing member 10 is fastened to the lid portion 4 by bonding the bonding portions 12 to the lid portion 4. Having fit the main body 3, the lid portion 4, and the reinforcing member 10 together, the operator welds these components to one another through the heat treatment or the like, so that these components are assembled integrally as described above.

In this glove box 1, the peripheral surface 10a of the reinforcing member 10 is supported by the respective support portions 11 at several points, thus making it possible to provide the reinforcing member 10 to the main body 3 as an integral body (or structure). Also, upon being fit together, the peripheral surface 10a of the reinforcing member 10 is in close contact with the respective support portions 11 of the main body 3, thereby exactly fastening the reinforcing member 10 to the main body 3.

Also, since therein forcing member 10 is formed into a grid-like configuration extending in the thickness direction, the weight of the reinforcing member 10 can be reduced without lowering the strength of the reinforcing member 10 with respect to a compression force in the thickness direction. Besides, since the reinforcing member 10 is provided not corresponding to the entire lid portion 4 but only to the upper portion thereof, the reinforcing member 10 can be reduced both in size and weight. Further, since the dimension in the thickness direction of the reinforcing member 10 is smaller at the bottom, the weight of the reinforcing member 10 can be also reduced. In the present embodiment, the pores 10c of the reinforcing member 10 are not opened for communicating in the thickness direction except for the opening portion 10b which is provided for use in attaching a lock. However, the reinforcing member 10 may be formed into a grid-like arrangement provided with the pores which are opened for communicating in the thickness direction as required.

In addition, provided that a reinforcing member 10 to be used includes the bonding portions 12 of the same shape, the reinforcing member 10 is allowed to have grid portions of different shapes or different intervals. In this way, the magnitude of the reaction force acting on the lid portion 4 is substantially the same as that of everywhere when the reinforcing member 10 is bonded to the lid portion 4, so is the deformation (substantially the same everywhere) of the lid portion 4 when the glove box 1 is assembled. It should be noted that, in the present embodiment, the bonding area between the reinforcing member 10 and the lid portion 4 is set such that it is possible to prevent a crinkling on the lid portion 4, so that the glove box 1 with a satisfactory outside appearance can be manufactured. In short, even when a different reinforcing member 10 is used, a glove box 1 having substantially the same outside appearance can be manufactured in a satisfactory manner. For example, as indicated by imaginary lines in FIG. 4, even when a reinforcing member 10 has its grid portions shaped narrower than that of the present embodiment, provision of the bonding portions 12 which are the same as those in the present embodiment can produce a glove box 1 having substantially the same outside appearance as that of the present embodiment.

With regard to this glove box 1, when the passenger is forced to move forward at a crash of the vehicle, the knees of the passenger hit the upper side of the lid portion 4, and the load from the passenger acts on the glove box 1 from the upper side of the lid portion 4. In other words, since the reinforcing member 10 is provided on the upper side of the glove box 1, the load applied from the passenger acts on the glove box 1 directly at the portion where the reinforcing member 10 is provided. Further, since the reinforcing member 10 is formed in such a manner that the dimension in the thickness direction is increased in the upward direction, the load applied from the passenger acts on the glove box 1 directly at the portion where the reinforcing member 10 has the larger size in the thickness direction than others. Moreover, since the reinforcing member 10 is given with a tilt in such a manner that the thickness direction thereof is substantially coincident with the direction in which the load from the passenger is applied to the glove box 1, the load acts so as to compress the reinforcing member 10 in the thickness direction.

As has been described, with the vehicle glove box 1 formed according to the present embodiment, by fitting the lid portion 4 into the main body 3 after having the respective support portions 11 of the main body 3 support the reinforcing member 10, the glove box 1 can be assembled in a simple and easy manner, thereby making it possible to reduce the burden to the operator (worker) when the glove box 1 is assembled. In other words, for example, it goes without saying that the present embodiment can omit complicated operations, such as the fastening with screws or the like during the assembly, which are otherwise essential in the aforementioned prior art where the reinforcing member is fastened to the main body with screws or the like. Moreover, a total number of components can be reduced by omitting components used for the fastening with screws or the like.

In the glove box 1 formed according to the present embodiment, since the reinforcing member 10 is provided to the main body 3 to form an integral structure, the rigidity and the strength of the glove box 1 can be improved efficiently. In other words, there would not be the problem that the reinforcing member responds (or contacts) to the main body 3 only in the vicinity of the portions fastened with the screws or the like, resulting in a reinforcing member failing to have a satisfactory rigidity compensating effect (which problem would otherwise occur when the reinforcing member is fastened to the main body with screws or the like).

With the use of the glove box 1 formed according to the present embodiment, the tilt is given to both the peripheral face 10a of the reinforcing member 10 and the respective support portions 11 of the main body 3. Therefore, the reinforcing member 10 can be fit into the main body 3 on the rear face 7 in a simple and easy manner. This also can reduce the burden to an operator (worker) when the glove box 1 is assembled.

Further, with the use of the vehicle glove box 1 formed according to the present embodiment, since the peripheral face 10a of the reinforcing member 10 and the respective support portions 11 of the main body 3 are in close contact with each other, the fastening of the reinforcing member 10 to the main body 3 can be thus ensured, which allows the reinforcing member 10 and the main body 3 to deform as one unit. Hence, when the load is applied to the glove box 1, the reinforcing member 10 and the main body 3 can together resist the load effectively. In other words, as compared with a situation in which the reinforcing member 10 and the main body 3 are not in close contact each other, the present invention ensures that the rigidity and the strength of the glove box 1 can be improved remarkably.

Moreover, in the glove box 1 formed according to the present embodiment, the main body 3, the lid portion 4, and the reinforcing member 10 are welded to one another and assembled integrally. Hence, the glove box 1 may be formed integrally, making it possible to largely improve the rigidity and the strength of the glove box 1.

Besides, in the glove box 1 formed according to the present embodiment, the reinforcing member 10 is reduced in weight without lowering the strength of the reinforcing member 10 with respect to a compression force in the thickness direction. Hence, even if the load is applied from the passenger to the reinforcing member 10 substantially in the compressing direction when the passenger's body hits the glove box 1 at the time of vehicle collision, the glove box 1 can support the passenger in a suitable manner, and there is no trouble in the safety in the event of the vehicle collision. Also, a reduction in weight of the reinforcing member 10 can reduce not only the burden to the operator when the glove box 1 is assembled, but also the weight of the glove box 1 itself, and hence, the weight of the vehicle.

Further, with the glove box 1 formed according to the present embodiment, by bonding the bonding portions 12 of the reinforcing member 10 to the lid portion 4, the fastening of the grid-like reinforcing member 10 to the lid portion 4 can be made more exact, thus making it possible to improve the rigidity and the strength of the glove box 1

Moreover, with the glove box 1 formed according to the present embodiment, provided that a reinforcing member has the bonding portions 12 of the same shape, the glove box 1 can be manufactured in the same manner even when the reinforcing member has the grid portions of a different shape, different intervals, etc. Hence, since the reinforcing member 10 can be changed depending on the strength required by the glove box 1, the present embodiment is quite advantageous for practical use.

Further, in a case where the different strength is required for the glove box 1 depending on the type of the vehicle or a place of destination, etc., it is necessary only to change the reinforcing member 10 alone, with all other components (except for the reinforcing member 10 itself) remaining the same, thereby making it possible to largely reduce the manufacturing cost.

In addition, with the glove box 1 formed according to the present embodiment, the reinforcing member 10 is reduced both in the weight and size. Hence, when the operator assembles the glove box 1, he or she only has to fit the light and compact reinforcing member 10 into the main body 3, so that the burden to the operator can be thus reduced. Also, a reduction of the reinforcing member 10 in the size and weight can reduce the manufacturing cost and the weight of the vehicle.

Besides, with the glove box 1 formed according to the present embodiment, the load applied from the passenger at the time of the vehicle collision acts on the glove box 1 directly at the portion where the reinforcing member 10 is provided, in particular, at the portion where the reinforcing member 10 has the larger size in the thickness direction. Hence, the glove box 1 can receive the load from the passenger efficiently, thereby making the present embodiment quite advantageous in terms of the safety in the event of the vehicle collision.

Further, in the glove box 1 formed according to the present embodiment, the tilt is given to the reinforcing member 10, so that the load applied from the passenger at the time of the vehicle collision can act in such a manner to compress therein forcing member 10 in the thickness direction. Hence, the reinforcing member 10 hardly deforms when the load from the passenger is applied thereto, thus efficiently enabling the glove box 1 to receive the load from the passenger.

Figure 5:
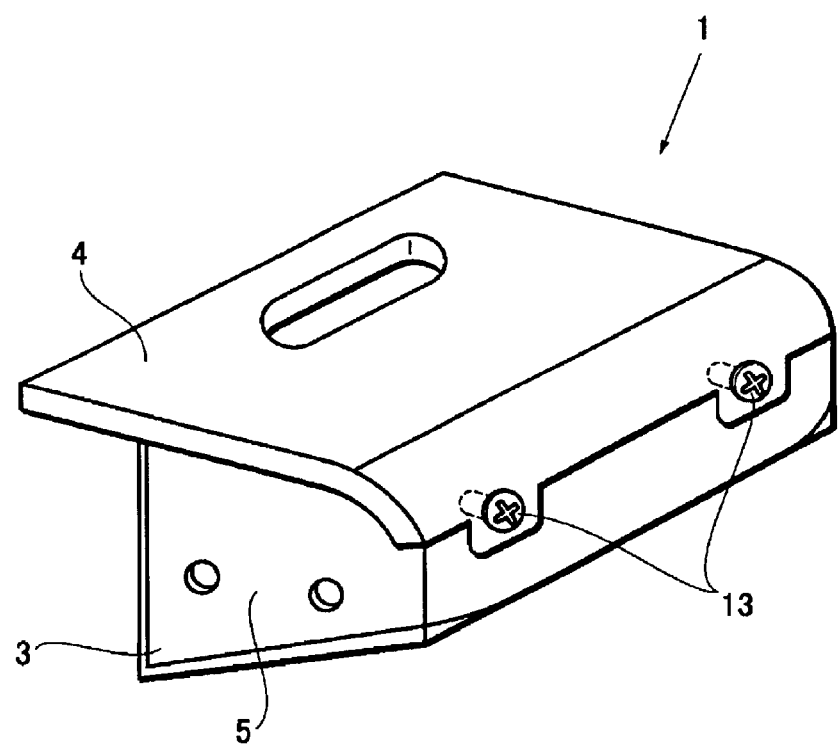
FIG. 5 is a perspective view showing an outward appearance of the glove box formed according to another embodiment of the invention.
Figure 6:
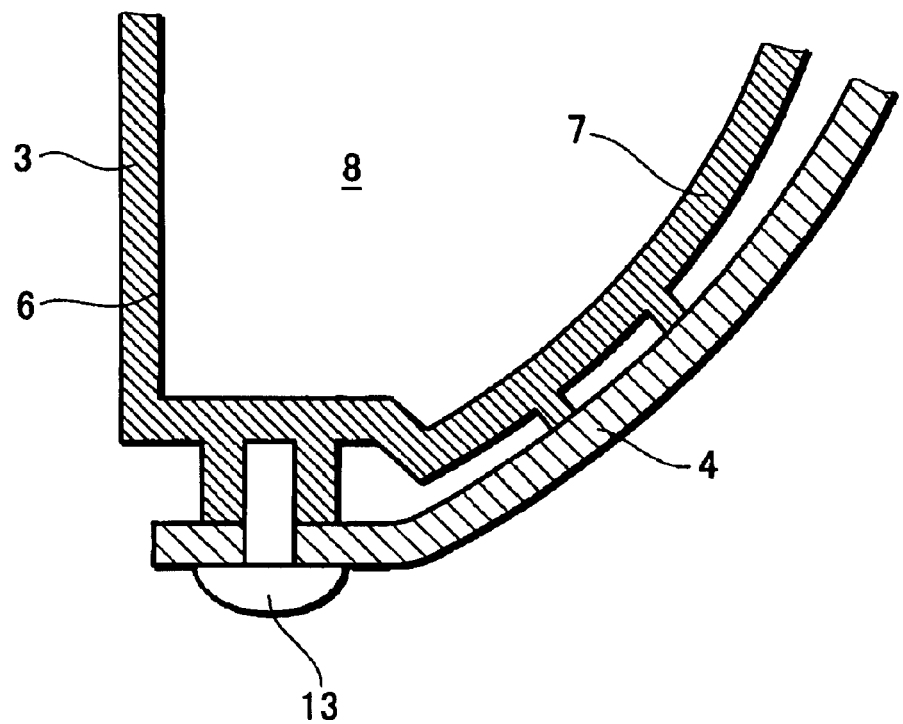
FIG. 6 is a partial cross section of the glove box shown in FIG. 5.

The embodiment described above provides an example where the reinforcing member 10 is located on the upper side of the glove box 1. However, it goes without saying that, in order to further improve the rigidity of the glove box 1, the reinforcing member 10 may be provided vertically across the glove box 1, or in a manner shown in FIGS. 5 and 6 in which the lower side of the lid portion 4 is fastened to the main body 3 by the screws 13. Besides, other detailed structures and the like may be changed as required.

As has been described above, with the use of the present invention, the operator is allowed to assemble the glove box in a simple and easy manner by having the respective support portions of the main body support the reinforcing member, and then fitting the lid portion into the main body. In this way, the burden to the operator for assembling the glove box can be reduced.

Also, since the peripheral face of the reinforcing member is supported by the respective support portions at the several positions, the reinforcing member can be attached to the main body so as to form the integral structure, thereby making it possible to efficiently improve the rigidity and the strength of the glove box.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A glove box for a vehicle, said glove box adapted to be opened and closed at an opening of an instrument panel facing a passenger compartment within the vehicle, said glove box comprising:

a main body portion adapted to be provided in the opening of the instrument panel, said main body portion having a rear face and an extended portion extending from a peripheral area of said rear face rearwardly so as to extend toward the passenger compartment when said main body portion is in the opening portion of the instrument panel;

a lid portion coupled to said main body portion and adapted to cooperate with said rear face and said extended portion to form a closed space;

a reinforcing member having a substantially plate-like configuration and positioned between said rear face and said lid portion; and a plurality of support portions extending from an inner surface of said extended portion toward an inside of the closed space to form protrusions for supporting a peripheral surface of said reinforcing member.

2. The glove box according to claim 1, wherein:

each of said plurality of support portions has a greater height in a direction extending from said lid portion toward said rear face; and said peripheral surface of said reinforcing member tilts in the direction extending from said lid portion toward said rear face to be in close contact with said support portion.

3. The glove box according to claim 1, wherein said main body portion, said reinforcing member, and said lid portion comprise resin and are assembled integrally.

4. The glove box according to claim 2, wherein said main body portion, said reinforcing member, and said lid portion comprise resin and are assembled integrally.

5. The glove box according to claim 1, wherein said reinforcing member comprises a grid-like structure having pores extending in a thickness direction thereof.

6. The glove box according to claim 2, wherein said reinforcing member comprises a grid-like structure having pores extending in a thickness direction thereof.

7. The glove box according to claim 3, wherein said reinforcing member comprises a grid-like structure having pores extending in a thickness direction thereof.

8. The glove box according to claim 5, wherein said reinforcing member is provided with bonding portions to be connected with said lid portion, said bonding portions being formed on one side of said reinforcing member and facing said lid portion.

9. The glove box according to claim 1, wherein said reinforcing member is provided on an upper side of said lid portion.

10. The glove box according to claim 1, wherein said reinforcing member is formed in such a manner that its thickness varies in a downward direction.

11. The glove box according to claim 1, wherein said reinforcing member is provided with bonding portions to be connected with said lid portion, said bonding portions being formed on one side of said reinforcing member and facing said lid portion.

12. The glove box according to claim 6, wherein said reinforcing member is provided with bonding portions to be connected with said lid portion, said bonding portions being formed on one side of said reinforcing member and facing said lid portion.

13. The glove box according to claim 7, wherein said reinforcing member is provided with bonding portions to be connected with said lid portion, said bonding portions being formed on one side of said reinforcing member and facing said lid portion.

14. A glove box for a vehicle, said glove box adapted to be opened and closed at an opening of an instrument panel facing a passenger compartment within the vehicle, said glove box comprising:

a main body portion adapted to be provided in the opening of the instrument panel, said main body portion having a rear face and an extended portion extending from a peripheral area of said rear face rearwardly so as to extend toward the passenger compartment when said main body portion is in the opening portion of the instrument panel;

a reinforcing member of a substantially plate-like configuration extending in a widthwise direction of said main body portion; and a plurality of support portions extending from an inner surface of said extended portion toward an inside of said extended portion to form protrusions for supporting a peripheral surface of said reinforcing member.

15. The glove box according to claim 14, wherein:

each of said plurality of support portions has a greater height in a direction extending toward said rear face; and said peripheral surface of said reinforcing member tilts in the direction extending toward said rear face, causing said peripheral surface to be in close contact with said support portions.

16. The glove box according to claim 14, wherein said main body portion and said reinforcing member comprise resin and are assembled integrally.

17. The glove box according to claim 14, wherein said reinforcing member comprises a grid-like structure having pores extending in a thickness direction thereof.

18. The glove box according to claim 14, wherein said reinforcing member is formed in such a manner that its thickness varies in a downward direction.

19. A glove box provided in an instrument panel in a passenger compartment of a vehicle, said glove box comprising:

a main glove box body provided in said instrument panel with an opening at an upper side thereof to permit containing of small items in said main glove box body;

a lid provided on a rear surface of said main glove box body;

a reinforcing member having a grid configuration, interposed between said main glove box body and said lid in order to effectively absorb shock upon collision of the vehicle; and a supporting member formed around said reinforcing member and behind said main glove box body to surround said reinforcing member.

20. A glove box for a vehicle, said glove box adapted to be opened and closed at an opening of an instrument panel facing a passenger compartment within the vehicle, said glove box comprising:

a main body portion adapted to be provided in the opening of the instrument panel, said main body portion having an interior and an exterior;

a lid portion coupled to said main body portion to form a closed section with a first surface of said main body portion;

a reinforcing member of a substantially plate-like configuration within said closed section of said main body portion; and a plurality of support portions extending from an inner surface of said main body portion to form protrusions extending toward the interior of said closed section of said main body portion for supporting a peripheral surface of said reinforcing member therewithin.

21. The glove box according to claim 20, wherein:

each of said plurality of support portions has a greater thickness in a direction extending from said lid portion toward said first surface of said main body portion; and said peripheral surface of said reinforcing member tilts in the direction extending from said lid portion toward said first surface of said main body portion, causing said peripheral surface to be in close contact with said support portions.

22. A glove box for a vehicle, said glove box adapted to be opened and closed at an opening of an instrument panel facing a passenger compartment within the vehicle, said glove box comprising:

a main body portion adapted to be provided in the opening of the instrument panel, said main body portion having an interior and an exterior;

a reinforcing member of a substantially plate-like configuration extending in a widthwise direction of said main body portion; and a plurality of support portions extending from an inner surface of said main body portion to form protrusions extending toward the interior of said main body portion for supporting a peripheral surface of said reinforcing member.

23. The glove box according to claim 22, wherein:

each of said plurality of support portions has a greater thickness in a direction extending toward the interior of said main body portion; and said peripheral surface of said reinforcing member tilts in the direction extending toward the interior of said main body portion, causing said peripheral surface to be in close contact with said support portions.

* * * * *